US009056952B2

(12) United States Patent
Eilbracht et al.

(10) Patent No.: US 9,056,952 B2
(45) Date of Patent: Jun. 16, 2015

(54) COMPOSITE MATERIALS COMPRISING AN OPEN-CELL POLYMER MATRIX AND GRANULES EMBEDDED THEREIN

(71) Applicant: Evonik Industries AG, Essen (DE)

(72) Inventors: Christian Eilbracht, Herne (DE); Carsten Schiller, Muelheim an der Ruhr (DE); Martin Glos, Borken (DE); Georg Markowz, Alzenau (DE); Thorsten Schultz, Hassenroth (DE)

(73) Assignee: Evonik Industries AG, Essen (DE)

( * ) Notice: Subject to any disclaimer, the term of this patent is extended or adjusted under 35 U.S.C. 154(b) by 294 days.

(21) Appl. No.: 13/623,528

(22) Filed: Sep. 20, 2012

(65) Prior Publication Data

US 2013/0071602 A1 Mar. 21, 2013

(30) Foreign Application Priority Data

Sep. 20, 2011 (DE) .......................... 10 2011 083 017

(51) Int. Cl.
| | |
|---|---|
| B32B 1/04 | (2006.01) |
| C08J 9/00 | (2006.01) |
| B32B 5/18 | (2006.01) |
| B32B 3/02 | (2006.01) |
| E04B 1/80 | (2006.01) |
| E04B 1/74 | (2006.01) |

(52) U.S. Cl.
CPC ............ *C08J 9/0066* (2013.01); *C08J 2205/05* (2013.01); *C08J 2375/04* (2013.01); *B32B 5/18* (2013.01); *E04B 1/803* (2013.01); *B32B 2266/0278* (2013.01); *B32B 2307/304* (2013.01); *E04B 2001/742* (2013.01)

(58) Field of Classification Search
USPC ................................ 53/408; 428/69; 521/170
See application file for complete search history.

(56) References Cited

U.S. PATENT DOCUMENTS

| | | | |
|---|---|---|---|
| 5,084,320 A | 1/1992 | Barito et al. | |
| 6,106,803 A | 8/2000 | Hasenzahl et al. | |
| 6,166,109 A | 12/2000 | Spitler et al. | |
| 6,646,540 B1 * | 11/2003 | Lussey | 338/47 |
| 7,241,436 B2 * | 7/2007 | Fife | 423/594.17 |
| 7,671,103 B2 | 3/2010 | Eilbracht et al. | |
| 7,829,647 B2 | 11/2010 | Bruckner | |
| 7,838,566 B2 | 11/2010 | Glos et al. | |
| 7,858,829 B2 | 12/2010 | Hubel et al. | |
| 8,030,366 B2 | 10/2011 | Ferenz et al. | |
| 2007/0021581 A1 | 1/2007 | Eilbracht et al. | |
| 2007/0123599 A1 | 5/2007 | Eilbracht et al. | |
| 2008/0125503 A1 | 5/2008 | Henning et al. | |
| 2008/0146688 A1 | 6/2008 | Glos et al. | |
| 2009/0088488 A1 | 4/2009 | Bruckner | |
| 2010/0029587 A1 | 2/2010 | Bruckner | |
| 2010/0036011 A1 | 2/2010 | De Gans et al. | |
| 2010/0071849 A1 | 3/2010 | Knott et al. | |
| 2010/0113633 A1 | 5/2010 | Henning et al. | |
| 2010/0240786 A1 | 9/2010 | Glos et al. | |
| 2010/0249982 A1 | 9/2010 | Chang et al. | |
| 2010/0292357 A1 | 11/2010 | Knott et al. | |
| 2010/0298455 A1 | 11/2010 | Henning et al. | |
| 2010/0300132 A1 | 12/2010 | Schultz et al. | |
| 2011/0028578 A1 | 2/2011 | Glos | |
| 2011/0034576 A1 | 2/2011 | Henning et al. | |
| 2011/0054055 A1 | 3/2011 | Schmitz et al. | |
| 2011/0062370 A1 | 3/2011 | Eilbracht et al. | |
| 2011/0129398 A1 | 6/2011 | Markowz et al. | |
| 2011/0257280 A1 | 10/2011 | Glos et al. | |
| 2011/0306694 A1 | 12/2011 | Glos et al. | |
| 2012/0037036 A1 | 2/2012 | Veit et al. | |
| 2012/0088856 A1 | 4/2012 | Glos et al. | |

FOREIGN PATENT DOCUMENTS

| | | |
|---|---|---|
| DE | 198 06 740 A1 | 11/1998 |
| DE | 100 05 873 A1 | 9/2000 |
| DE | 102004031967 A1 | 1/2006 |
| EP | 1939151 A1 | 7/2008 |

OTHER PUBLICATIONS

Adams, L, "Less Space, Better Insulation", Sep. 1, 2010, http://www.appliancedesign.com/Articles/Article_Rotation/BNP_GUID_9-5-2006_A_10000000000000893355.

European Search Report dated Jan. 17, 2013, received in a corresponding foreign application.

* cited by examiner

*Primary Examiner* — Terressa Boykin
(74) *Attorney, Agent, or Firm* — Scully, Scott, Murphy & Presser, P.C.

(57) ABSTRACT

Composite materials are provided that include an open-cell polymer foam matrix including one or more polymers and, embedded into the polymer foam matrix, granules or shapes which have an open porosity.

12 Claims, No Drawings

COMPOSITE MATERIALS COMPRISING AN OPEN-CELL POLYMER MATRIX AND GRANULES EMBEDDED THEREIN

FIELD OF THE INVENTION

The present invention is directed to composite materials comprising an open-cell polymer foam matrix comprising one or more polymers and, embedded into the polymer foam matrix, granules or shapes which have an open porosity. The present invention also relates to a method for producing such composite materials, and to use of the composite materials as an insulating material.

BACKGROUND OF THE INVENTION

In the field of thermal insulation, vacuum insulation panels (VIPs) manufactured by enveloping a porous core material—for example, compacted fumed silica (Aerosil), fibre mats or open-cell foams—with a gas-tight sheet material and then carrying out evacuation are known. These panels permit excellent thermal insulation (thermal conductivities $<3.5*10^{-3}$ $W*m^{-1}*K^{-1}$, determined in accordance with DIN 52 612, at 10° C., are realisable), but the insulating effect suffers markedly if the gas-tight sheet is damaged. These panels, consequently, have to be produced with particular desired dimensions and installed in a protected fashion (http://www.va-q-tec.com/).

The core material used has a substantial influence over the properties of a vacuum insulation panel. On one hand, the core material—as well as the gas and its residual pressure in the evacuated panel—determines the thermal conductivity and hence the heat insulation performance, and on the other hand, the mechanical properties such as compressive strength, fracture sensitivity and dimensional stability are substantially dependent on the core material.

The influence of the core material over the thermal conductivity can be subdivided into two mechanisms. The first is a direct contribution to thermal conductivity by thermal conduction in the solid phase of the core material. The second and more important mechanism is an indirect contribution by influence on the gas-phase thermal conductivity: if the core material possesses a very finely structured pore system, the gas-phase thermal conductivity—particularly at low gas pressures—may fall below the value anticipated for the gas composition. This effect is called the Knudsen effect. The Knudsen effect occurs when the free path length of the gas molecules is greater than the diameter of the pores in which the gas is located. Collisions of the gas molecules with the pore walls then become more probable than collisions of the gas molecules with one another. This may proceed to an extent such that collisions of the gas molecules with one another are suppressed entirely. Without collisions, there is no transfer of thermal energy, and gas-phase thermal conduction is switched off. Consequently, the smaller the average pore diameter of a core material in VIPs, the more efficient that core material. Small pore diameters cause the Knudsen effect to set in even at relatively high gas pressures, and the pressure does not need to be lowered to the same extent in order to suppress entirely the gas-phase thermal conductivity. A comprehensive discussion of these relationships, including measurements of the relationship between pressure and thermal conductivity for various core materials, is found at www.ecbcs.org/docs/Annex_39_Report_Subtask-A.pdf.

These measurements demonstrate that silica, more particularly fumed silica compacted to form boards/shapes, constitutes a particularly advantageous core material for vacuum insulation panels. The extraordinarily fine structuring of these powders results in a pronounced Knudsen effect. One disadvantage of using silica as a core material is the bad mechanical properties of this core material. Pressings made from compacted powders are naturally pressure-sensitive and fracture easily.

The open-cell polymer foams that are also part of the prior art generally have substantially better mechanical properties and can be brought by cutting into any desired form. However, because of the much higher pore diameter, such foams require a very low residual pressure in order to achieve the same insulating properties as panels with cores made from compacted silica.

SUMMARY OF THE INVENTION

The present invention provides a core material for vacuum insulation applications (panels or other shapes) which combines the outstanding relationship between pressure and thermal conductivity of compacted silica with the good mechanical properties of open-cell polymer foam materials.

The present invention provides composite materials comprising an open-cell polymer foam matrix comprising one or more polymers and, embedded into the polymer foam matrix, granules and/or shapes which also have an open porosity.

The present invention also provides a method for producing a composite material, in which a material for producing a polymer foam matrix is mixed with granules and/or shapes having an open porosity, and from this mixture an open-cell polymer foam matrix is generated in which the granules are embedded.

The present invention further provides an insulating material, in particular a vacuum insulation panel, and also articles which comprise the composite material of the present invention.

The composite materials of the invention have the advantage that they can be manufactured in virtually any imaginable shape and size. Moreover, the composite materials of the invention can be cut to any desired sizes and shapes. Consequently, the composite materials of the invention can be employed in a substantially more multi-faceted way than for the production of vacuum insulation elements. Also, the composite materials of the present invention can produce end products which are mechanically more robust than the compacted silicas known from the prior art, but at the same time do not require such low residual pressures as open-cell polymer foam materials.

Vacuum insulation panels made from the composite materials of the invention have the advantage, that they have a thermal conductivity (determined in accordance with DIN 52 612, at 10° C.) of less than $18*10^{-3}$ $W*m^{-1}*K^{-1}$.

DETAILED DESCRIPTION OF THE INVENTION

The composite materials of the invention, the method for their production, and the uses thereof are described by way of example below, without any intention that the invention should be confined to these exemplary embodiments. Where, ranges, general formulae or classes of compound are indicated herein below, the intention is that they should encompass not only the corresponding ranges or groups of compounds that are explicitly stated, but also all sub-ranges and sub-groups of compounds which are obtainable by extraction of individual values (ranges) or compounds. Where documents are cited in the context of the present description, the intention is that their content, especially with regard to the substantive subject-matter referred to, should in its entirety form part of the disclosure content of the present invention. If average values are indicated below, the average in question, unless otherwise specified, is the numerical average. If figures in percent are indicated below, then the percentage in question, unless otherwise specified, is % by mass.

The composite materials of the invention comprise a polymer foam matrix comprising one or more polymers in which granules or shapes having open porosity are embedded therein. The mass fraction of the granules in the composite material is preferably 20% to 99% by mass, more preferably 50% to 90% by mass. The granules or shapes may consist substantially of one or more organic materials and/or of one or more inorganic materials. The expression "substantially" is used throughout the present disclosure to denote a %-by-mass fraction of at least 70%, preferably at least 90%, based on the total mass of the granule. The granules preferably consist substantially of inorganic materials, more particularly of oxygen-containing compounds or salts of metals or semimetals. Preferred oxygen-containing compounds are aluminium oxides or aluminosilicates or silicon dioxides or silicas, more particularly fumed or precipitated silicas. Especially preferred granules consist substantially of compacted powders of fumed silica and/or, preferably, of precipitated silica. Additionally, various opacifiers such as, for example, SiC, carbon black, graphite, iron oxides or $TiO_2$, alone or in combination, with fractions of preferably 1% to 30% by mass, more preferably 5% to 10% by mass (based on the granule or powder mass) may also be. The presence of opacifier may achieve a reduction in radiative thermal conduction. Furthermore, for the purpose of mechanical stabilization, the granules or shapes may comprise fibres, such as glass, ceramic or polymer fibres, for example, and also auxiliaries from the granulation process, examples are binders.

The granules preferably have an average grain size $d_{50}$ of 50 μm to 100 mm, preferably from 100 μm to 50 mm and more preferably from 0.5 mm to 20 mm (determined in accordance with DIN 66165-2). In order to obtain a maximum filling level and/or for improving processing, it may be useful to use specific distributions of the grain-size distribution, such as bimodal or trimodal distributions, for example. Alternatively to granules, having a granule-grain shape and size distribution dependent on the granulating process, it is also possible to use shapes with defined geometry, examples are spheres or cuboids. In this case, corresponding ranges as for the average grain size of the granules apply in respect of the preferred dimensions in the three directions of space. Corresponding shapes will hereafter be referred to as granules.

In accordance with the present invention, the individual grains of the granule each have an open porosity. From a morphological viewpoint, this may comprise a network of open pores and/or channels. The granule grains or shapes preferably consist substantially of compacted powders, and so an open pore system is maintained between the individual primary particles. Particular preference is given to using powders which are very finely divided or even nanostructured, producing correspondingly finely structured pore systems. Preferred powders or materials have a BET surface area of greater than 5 $m^2/g$, more preferably of 50 $m^2/g$ to 1000 $m^2/g$ (in accordance with ISO 9277).

The granules present in the polymer matrix preferably have a porosity $\Phi$, i.e., a ratio of the volume of the closed-off cavity to the total volume of the granule grain, of 50% to 99.9%, more preferably of 75% to 99%. The total volume of the granule or of a granule grain or shape with closed-off cavity can be ascertained by determining the displaced volume of a suitable non-wetting liquid, e.g., mercury. The volume of the pores (open and closed pores) can be determined by subtracting the volume of the granule solids from the total volume. The volume of the solids can be calculated easily from the ascertained mass if the density of the solids material is known, or else the granules whose total volume has been determined are ground to an average grain size $d_{50}$ of 20 μm, using a mill or mortar, and the volume or density of the resultant powder is ascertained.

The polymer foam matrix into which the granule grains or shapes are embedded is of a (largely) open-cell formation. The proportion of open cells can be measured by means of gas-pycnometry, by taking samples of the polymer foam matrix from regions between the granule grains, and also by producing samples of the polymer foam without addition of granules. The open-cell proportion of the polymer foam matrix into which the granule grains or shapes are embedded is preferably greater than 50%, more preferably greater than 80% (determined in accordance with DIN 4590).

The polymer foam matrix may comprise all known, in particular foamable, polymers, individually or in blends. Particularly preferred polymers which may be present in the polymer matrix are selected, for example, from polystyrene (PS), polyurethane (PU) and polymethyl methacrylate (PMMA). Particularly preferred polymer matrices are those which comprise rigid PUR or polyisocynanurate (PIR) foams. For producing a polymer foam matrix it is possible to use conventional manufacturing methods, such as, for example, RIM (reaction injection molding) processes or extrusion processes.

As already stated for the granule, the polymer matrix may also comprise an opacifier. An opacifier of this kind may again be selected, for example, from carbon black, $TiO_2$, graphite or SiC, and the nature and proportion of the opacifier in the polymer matrix may differ from those in the granule. The fraction of opacifier, based on the total mass of the polymer matrix, is preferably 0.5% to 30% by mass, more preferably 1% to 10% by mass.

It is essential to the invention that not only the individual components of the composite material—in each case considered separately—have an open porosity, but that in the composite material the pore systems in the granule grains communicate with the pore system of the polymer foam matrix, i.e., there is a continuously open porosity throughout the material. Only in this way is it possible for the material to be evacuated throughout its volume when an external vacuum is applied—an essential prerequisite for application as a core material in vacuum insulation applications. This is measurable by gas-pycnometric determination of the open-cell proportion of samples of the completed composite material. The open-cell proportion is preferably greater than 50%, with particular preference being given to open-cell proportions of greater than 80% (determined in accordance with DIN 4590).

In some embodiments, it may be advantageous if a pressure in the open pores of the polymer foam matrix (and in the open and available pores of the granules) is less than the atmospheric pressure (1 bar). A pressure in the open pores of the polymer foam matrix is preferably less than 500 mbar, more preferably from 0.001 to 200 mbar. In order to prevent pressure equalization between open pores in the polymer foam matrix and the surrounding atmosphere, the composite material of the invention comprises the polymer foam matrix preferably in a gas-tight shell of metal, glass, plastic or a composite of these materials—for example, a metalized polymeric film. Such composites of two or more materials may be, for example, multi-layer laminates e.g., with a polyethylene terephthalate outer layer (PET outer layer), aluminium barrier layer and polyethylene inner layer.

In some instances, it may be advantageous to set the composition of the gas atmosphere in the pores of the polymer foam matrix (and in the open and available pores of the granules) prior to the evacuation and/or to the setting of the pressure. The gas composition is preferably selected so as to achieve a low thermal conductivity. Preferred gases with low gas-phase thermal conductivity are the typical blowing gases such as, for example, $CO_2$, hydrocarbons having 3 to 5 carbon atoms, preferably cyclo-, iso- and n-pentane, hydrofluorocarbons (saturated and unsaturated), preferably HFC 245fa, HFC 134a and HFC 365mfc, hydrofluorochlorocarbons (saturated and unsaturated), preferably HCFC 141b, oxygen-containing compounds such as methyl formate and dimethoxy methane, or hydrochlorocarbons, preferably 1,2-dichloroethane. It may, however, also be advantageous if a gas with a low molar mass (less than 21 g/mol), for example, hydrogen, helium, methane, ammonia, water or neon, is present as an insulating gas in the pores of the polymer foam matrix and/or of the granules.

The composite material of the invention is preferably a vacuum insulation element or is used as a vacuum insulation element or for producing such an element.

The composite materials of the invention can be produced in various ways. Preferred composite materials of the invention are those which are obtainable by the method of the invention, which is described below.

The method of the invention for producing a composite material of the invention is distinguished by the fact that a material for producing a polymer foam matrix is mixed with granules having an open porosity, and from this mixture a polymer foam matrix is generated in which the granules or shapes are embedded.

The granules (or shapes) that are used are produced preferably from precursors which are in powder form and have the above-described composition and properties. For this purpose it is possible to use all conventional granulating and tableting procedures, such as, for example, fluidized-bed granulation, compacting and optionally crushing, or low-pressure extrusion, where appropriate with use of liquids for dispersing and/or of additional binders. Granules and shapes obtainable in these ways have an open porosity.

In order to prevent the granules from becoming encapsulated during the subsequent embedding into the polymer foam matrix as a result of a compact shell of the polymer on the surface of the granule grains and thereby interrupting the communication of the pore systems in granule grains and matrix, it may be necessary to adjust the wetting properties between the polymer and the granules by means of a surface modification. The surface modification may take place at the stage of the powder-form starting material of the granules—alternatively it is also possible for commercially available powders to be used that are already surface-modified—or the modification takes place in the course of granulation, or—as a third option—it takes place after granulation, on the completed granule grains. Methods that can be used for surface modification include all of the methods familiar to the skilled person, examples include, vapor deposition, spraying or impregnating with or immersing in a modifying agent. Suitable modifying agents include any of a very wide variety of substances, which either attach physically to the surface or bind to it chemically. Preferred modifying agents are siloxanes and silanes of all kinds, more preferably chlorosilanes, for example, dimethyldichlorosilane or chlorotrimethylsilane, alkoxysilanes, for example, alkyltriethoxysilanes, silazanes, for example, hexamethyldisilazane, and also cylic or linear oligo- or poly-dimethylsiloxanes. Physical methods may also be used for the surface modification, such as, for example, a plasma treatment.

As material for producing the polymer foam matrix it is possible to use a polymer or a mixture of polymers, or the reactants for generating the polymer or polymers. The amount of granules/shapes to be used and polymers to be used, and/or of their starting materials, is preferably selected such that the resultant composite material has the mass fraction of granules/shapes that was indicated above as being preferred.

In some embodiments, it may be advantageous if the method of the invention includes at least one method step in which the material for producing the polymer foam matrix, or a part thereof, is at least partly in the liquid aggregate state and this liquid phase is mixed with the granules. In order to facilitate the mixing operation of polymer with granule or shapes, it may be advantageous if the polymer is converted into a liquid or fluid state by being dissolved in a suitable solvent or by melting. After the mixing operation, the polymer matrix is solidified by cooling to below the melting temperature and/or by removal of the solvent. Alternatively, the mixing operation with the granules may also take place at the stage of the starting compounds for generating the polymer matrix, i.e., with the monomers or prepolymeric compounds. In that case the polymer matrix comes about directly in the composite material as a result of a polymerization reaction or crosslinking reaction. This variant is preferred when the polymer matrix belongs to the group of the thermosets. In a further embodiment of the method of the invention, the granules or shapes are mixed with a granulated polymer. Joining to form the composite material in that case takes place typically by heating, with the polymer melting or at least softening, and adhesively bonding the granules.

Advantageously, the method of the invention includes a method step of foaming. Foaming may take place mechanically/physically or chemically. In the case of mechanical/physical foaming, air or gas, or a gas mixture, is introduced in gaseous form into a viscous polymer composition, and this viscous polymer composition is subsequently cured, causing the introduced air or gas/gas mixture to be enclosed in bubbles in the polymer composition. Polymer foams can also be generated physically by admixing a polymer composition with one or more blowing agents which, on heating, change their aggregate state from liquid or solid to gaseous and thus lead to foam formation. Suitable and known blowing agents are, for example, hydrocarbons which are liquid at room temperature, such as, for example, pentanes. Where the composition of the invention includes additional blowing agents, these may be physical or chemical blowing agents. Suitable physical blowing agents for the purposes of this invention are gases, examples are liquefied $CO_2$, and volatile liquids, examples are hydrocarbons having 3 to 5 carbon atoms, preferably cyclo-, iso- and n-pentane, hydrofluorocarbons, preferably HFC 245fa, HFC 134a and HFC 365mfc, hydrofluorochlorocarbons, preferably HCFC 141b, oxygen-containing compounds such as methyl formate and dimethoxy methane, or hydrochlorocarbons, preferably 1,2-dichloroethane. Chemical generation of foam is possible, for example, through compounds being formed during the polymerization that are gaseous at the polymerization temperatures. One typical chemical blowing agent is, for example, water, which is formed in polymerization reactions that are based on a condensation reaction. Besides water, other chemical blowing agents may also be used. In the case of the production of polyurethane foams, for example, those which react with the isocyanates used and in so doing give off gas, such as water or formic acid.

The open-cell proportion of the polymer foam matrix may be achieved by means of a correspondingly tailored foaming method, for a suitable choice of the formulation on which the polymer foam matrix is based, and/or by the use of cell openers. In this case it is possible to use all of the cell openers familiar to the skilled person, examples are solid fillers or incompatible liquids, such as silicones, organically modified silicones, polyacryates or polybutadienes.

Using the example of a composite material with a foamed polyurethane matrix, various versions of the method of the invention will be discussed in more detail. Foamed polyurethane is generally a highly crosslinked thermoset which is neither soluble in usual solvents such as, for example, water or acetone nor meltable without decomposition. Mixing with the granules takes place preferably at the stage of providing monomeric and/or prepolymeric compounds. A polyurethane system for the production of foams generally features two components (A) and (B), with one component being composed of compounds having reactive hydrogen atoms, known as the polyol component (A), and the second component (B) having one or more isocyanates. Customary auxiliaries and adjuvants may be formulated into the polyol component (A) or metered in separately. The granules or shapes are mixed preferably with the polyol component, with the isocyanate component or—with particular preference—with a fresh reaction mixture of these components. The two first-mentioned cases are suitable only for low levels of filling and small grain diameters on the part of the granules, since the granules and shapes must be pre-dispersed in component (A) or (B), and this dispersion must then be intimately mixed with the second component. The preferred case of incorporation of the granules/shapes into a fresh reaction mixture of (A) component and (B) component allows the trouble-free processing of large grain diameters. The incorporation of granules/shapes in the reaction mixture may take place prior to transfer to the mold, or else granules/shapes are introduced as packing or filling in a hollow mold and are infiltrated, or the grains surround-foamed, with the liquid, foaming reaction mixture. For the production of insulating boards, a continuous method analogous to the production of polyurethane insulating boards, by the double transport belt method, can also be employed. In that case the granules/shapes can be scattered onto the lower top layer either before or after the application of the polyurethane reaction mixture, with the individual grains being surround-foamed. In this case the composite material is cured by the polyaddition reaction involving crosslinking to form the polyurethane.

The typical composition of a polyurethane system is described in more detail below:

As polyol components (A) it is possible to use the compounds customary for the formulation of insulating foams, examples are polyether polyols and polyester polyols. Polyether polyols can be obtained by reacting polyhydric alcohols or amines with alkylene oxides. Polyester polyols are based preferably on esters of polybasic carboxylic acids (usually phthalic acid or terephthalic acid) with polyhydric alcohols (usually glycols).

As (poly)isocyanate component (B) it is possible to use the compounds customary for the formulation of insulating foams, examples are 4,4'-diphenylmethane diisocyanate (MDI), toluene diisocyanate (TDI), hexamethylene diisocyanate (HMDI) and isophorone diisocyanate (IPDI). Particularly suitable is the mixture of MDI and its analogues with higher degrees of condensation, having an average functionality of 2 to 4, this mixture being known as "polymeric MDI" ("crude MDI").

A suitable ratio of isocyanate and polyol, expressed as the index of the formulation, is situated in the 50-500 range, preferably 100-350. The index describes the ratio of isocyanate actually used to isocyanate calculated (for a stoichiometric reaction with polyol). An index of 100 stands for a molar ratio of the reactive groups of 1:1.

As auxiliaries and additives it is possible to use compounds that are customary used for the formulation of insulating foams, including catalysts, cell stabilizers, blowing agents, flame retardants, fillers, dyes and light stabilizers.

Suitable catalysts for the purposes of this invention are, for example, substances which catalyze the gel reaction (isocyanate-polyol), the blowing reaction (isocyanate-water) or the dimerization or trimerization of the isocyanate. Typical examples are the amines triethylamine, dimethylcyclohexylamine, tetramethylethylenediamine, tetra-methylhexanediamine, pentamethyldiethylenetriamine, pentamethyldi-propylenetriamine, triethylenediamine, dimethylpiperazine, 1,2-dimethylimidazole, N-ethylmorpholine, tris(dimethylaminopropyl)hexahydro-1,3,5-triazine, dimethylamino-ethanol, dimethylaminoethoxyethanol and bis(dimethylaminoethyl) ether, tin compounds such as dibutyltin dilaurate and potassium salts such as potassium acetate and potassium 2-ethylhexanoate. Suitable amounts for use are guided by the type of catalyst and are situated typically in the range from 0.05 to 5 parts by weight, or 0.1 to 10 parts by weight for potassium salts, based on 100 parts by weight of polyol.

Suitable cell stabilizers are, for example, surface-active substances such as, for example, organic surfactants or, preferably, silicone surfactants (polyether-polydimethylsiloxane copolymers). Typical amounts of polyethersiloxane cell stabilizers for use are 0.5 to 5 parts by weight per 100 parts by weight of polyol, preferably 1 to 3 parts by weight per 100 parts by weight of polyol.

Suitable cell openers are, for example, incompatible liquids such as, for example, silicone oils, organically modified silicones, polyacrylates or polybutadienes. Typical amounts of cell openers that are used are 0.01 to 5 parts by weight per 100 parts by weight of polyol, preferably 0.1 to 3 parts by weight per 100 parts by weight of polyol. Suitable cell openers are sold, for example, under the trade names TEGOSTAB® and ORTEGOL® by Evonik Industries AG.

The foamable formulation may be admixed with water as a chemical blowing agent, since it reacts with isocyanates and gives off carbon dioxide gas in the process. Suitable amounts of water for the purposes of this invention are dependent on whether, in addition to the water, physical blowing agents are or are not used. In the case of purely water-blown foaming, the levels for the water content are preferably 1 to 20 parts by weight per 100 parts by weight of polyol; where other blowing agents are used in addition, the amount for use reduces preferably to 0.1 to 5 parts by weight of water per 100 parts by weight of polyol. Suitable physical blowing agents have already been specified.

Insulating foams for the heat insulation of buildings are subject to fire control requirements and must preferably be made flame retardant. In principle all customary flame retardants are suitable. The following flame retardants can be used liquid organic phosphorus compounds, such as halogen-free organic phosphates, e.g., triethyl phosphate (TEP), halogenated phosphates, e.g., tris(1-chloro-2-propyl)phosphate (TCPP) and tris(2-chloroethyl)phosphate (TCEP), or organic phosphonates, e.g., dimethyl methanephosphonate (DMMP), dimethyl propanephosphonate (DMPP) or solids such as ammonium polyphosphate (APP) or red phosphorus. Additionally suitable as flame retardants are halogenated compounds, examples are halogenated polyols, and also solids such as expandable graphite and melamine.

A typical polyurethane or polyisocyanurate insulating foam formulation in the sense of this invention would result in a density of 5 to 50 kg/m$^3$ and have the following composition:

| Component | Weight fraction |
| --- | --- |
| Polyol | 100 |
| (Amine) catalyst | 0.05 to 5 |
| Potassium trimerization catalyst | 0 to 10 |
| Stabilizer | 0.5 to 5 |
| Cell opener | 0 to 5 |
| Water | 0.1 to 20 |
| Blowing agent | 0 to 40 |
| Flame retardant | 0 to 50 |
| Isocyanate index: 50 to 500 | |

The formulations of the invention can be processed to rigid foams by any of the methods familiar to the skilled person, as for example in a manual mixing procedure or, preferably, using high-pressure foaming machinery.

The amount of granules to be used and of polymer and/or starting materials thereof to be used is preferably selected such that the resulting composite material has the mass of granules indicated above as being preferred and/or has the mass ratio indicated above as being preferred.

The composite material of the invention, more particularly the polymer foam matrix, may either be used directly or taken from a larger block, in which case any of a very wide variety of mechanical methods such as cutting, sawing or milling may be employed. Alternatively the polymer foam matrix may be produced directly in a hollow mold having the desired geometry.

Where the composite material is to have an open-cell polymer foam matrix in which there is an underpressure relative to the ambient pressure (atmospheric pressure of 1 bar), this can be achieved by evacuating the polymer foam matrix of the invention and subjecting it optionally to gas-tight encapsulation.

In order to generate an underpressure in the pore system of the polymer foam matrix (and in the open and available pores of the granules), the composite material is preferably subjected to an external underpressure and/or to an elevated temperature and is encapsulated preferably under these conditions. By encapsulation is meant the provision of a gas-impermeable barrier layer. In the case of encapsulation at or below room temperature, the pressure (underpressure) at which the provision of the barrier layer takes place is preferably less than 500 mbar, more preferably from 0.001 to 200 mbar. Where elevated temperatures are employed when applying the barrier layer, the pressure need not be lowered to such an extent, since the internal pressure reduces further on cooling.

For producing the barrier layer it is possible to use a variety of materials. Preference is given to using materials impervious to diffusion, such as metals, plastics or glasses, either alone or in combination with other materials. In order to make the contribution of the barrier layer to thermal conduction low, the aim should be for a low wall thickness, preferably less than 1 mm, while nevertheless retaining the high level of imperviousness to diffusion. A preferred method for producing the barrier layer is the enveloping of the composite moulding with a gas-tight film. Single-ply or multi-ply, preferably multi-ply, polymer films can be used for this purpose which comprise one (or more) thin metal layer(s) as a diffusion barrier. The film can be sealed by being, for example, adhesively bonded or welded.

A further method for encapsulating the composite molding is to seal it using polymers which cure with crosslinking. For this purpose, a shape made of the polymer foam matrix with embedded granules can be immersed into a liquid preparation of the capsule material, or have such a preparation poured over it, or be sprayed or otherwise surface-wetted with such a preparation. Alternatively to a chemically reactive encapsulating material, it is also possible to use a melt of a thermoplastic polymer. In some embodiments, it may be advantageous to apply combinations of the aforementioned encapsulation methods in two-stage or multi-stage steps.

In some cases, it may be advantageous to set to a specific composition the composition of the gas atmosphere in the open-cell pores of the polymer foam matrix (and optionally the open-cell granules) prior to evacuation (to the setting of the pressure). The gas composition is preferably selected such that the thermal conductivity is as low as possible. There are preferably two different parameters to be observed here: first, the gas-phase thermal conductivity of the gas composition, and secondly the free path length of the gas molecules. Preferred gases with a low gas-phase thermal conductivity are, for example, the typical blowing gases, such as $CO_2$, hydrocarbons having 3 to 5 carbon atoms, preferably cyclo-, iso- and n-pentane, hydrofluorocarbons (saturated and unsaturated), preferably HFC 245fa, HFC 134a and HFC 365mfc, hydrofluorochlorocarbons (saturated and unsaturated), preferably HCFC 141b, oxygen-containing compounds such as methyl formate and dimethoxymethane, or hydrochlorocarbons, preferably 1,2-dichloroethane. In the case of finely structured pore systems and low gas pressures, however, the gas-phase thermal conductivity may drop below the value anticipated for the gas composition. This effect is called the Knudsen effect. The Knudsen effect occurs when the free path length of the gas molecules is greater than the diameter of the pores in which the gas is located. Collisions of the gas molecules with the pore walls then become more probable than collisions of the gas molecules with one another. This may proceed to an extent such that collisions of the gas molecules with one another are suppressed entirely. Without collisions, there is no transfer of thermal energy, and gas-phase thermal conduction is switched off. In contrast to the thermal conductivity, the free path length goes up as the molar mass of the gas molecules drops. It may therefore be advantageous to use a gas with a low molar mass, preferably less than 21 g/mol, such as hydrogen, helium, methane, ammonia, water or neon, for example, as insulating gas in the pores of the granule grains or shapes, if the Knudsen effect outweighs the thermal conductivity—which is actually high—of these gases. The setting of the gas composition in the open-cell pores of the polymer foam matrix may be accomplished, for example, by subjecting the polymer foam matrix one or more times to an underpressure, and then exposing it to the desired gas composition. It is also possible to expose the polymer foam matrix one or more times to a gas atmosphere which is at overpressure or to let it down again in each case. In both ways there is an accumulation of the desired gas atmosphere in the open-cell pores.

By means of the method of the invention it is possible to obtain the composite materials of the invention and the vacuum insulation elements of the invention.

The composite materials of the invention and the vacuum insulating elements of the invention may be used for a variety of insulation purposes. The composite materials are preferably used for the insulating of buildings, of space, air, open-water and/or land vehicles or of parts of cooling or heating systems and assemblies. The composite materials of the invention or the vacuum insulation elements of the invention can, for example, be used as insulating material in refrigeration equipment and hot-water reservoirs or for insulating pipelines (e.g. local and district heating lines).

In certain areas of application, where a hollow space within a component is to be filled with an insulating material, the shell of the component may take on the function of the gas-tight capsule. This applies, for example, to the filling of profiles for construction uses, for example as being window frames or door frames, roller-shutter elements, sectional gates, and so on. These profiles then represent the composite material of the invention. These composite materials of the invention have the advantage that the open-cell polymer foam matrices comprising the open-cell granules in embedded form can be produced directly in the hollow space that is to be filled.

A distinctive feature of corresponding articles of the invention is that they comprise a composite material of the invention.

In the examples given below, the present invention is described on an exemplary basis, without any intention that the invention—the scope of which is evident from the overall description and the claims—should be restricted to the embodiments specified in the examples.

EXAMPLES

Example 1

Production of Granules

80% by weight of AEROSIL® 200 (fumed silica from Evonik Industries AG, BET surface area 200 m²/g), 15% by weight of AROSPERSE 15 (thermal carbon black from Orion Engineered Carbons) and 5% by weight of glass fibres (glass fibre slithers, approximately 12 mm fibre length) were intimately mixed. This mixture was transferred in 0.6 g portions into a cylindrical compression mould with a diameter of 2 cm and compressed by means of a hydraulic press to form tablets each with a height of 1 cm. The density of the tablets was approximately 200 kg/m³. For surface hydrophobizing, the tablets were immersed for 5 seconds into a mixture of 5 parts by weight dichloromethylsilane and one part by weight chlorotrimethylsilane and then dried in the air for 2 hours. For further conditioning, the tablets were post treated in a vacuum drying oven at 50° C. and 1 mbar for 2 hours.

Example 2

Production of a Composite Material by Enveloping Granules with Rigid Polyurethane Foam The polymer matrix used was a rigid polyurethane foam formulation in accordance with Table 1.

TABLE 1

| open-cell PUR formulation | |
| --- | --- |
| Component | Weight fraction |
| Caradol 520-07 * | 100 parts |
| N,N-Dimethylaminoethoxyethanol | 1.5 parts |
| Water | 4.0 parts |
| TEGOSTAB ® B 8444 ** | 1.0 parts |

TABLE 1-continued

| open-cell PUR formulation | |
| --- | --- |
| Component | Weight fraction |
| ORTEGOL ® 500 *** | 0.5 parts |
| Desmodur 44V20L **** | 205.0 parts |

\* Polyether polyol from Shell
\*\* Stabilizer from Evonik Industries AG
\*\*\* Cell opener from Evonik Industries AG
\*\*\*\* Polymeric MDI from Bayer, 200 mPa * s, 31.5% by weight NCO, functionality 2.7

The polyurethane foaming operations were conducted in a manual mixing procedure. Polyol, amine catalyst, water, foam stabilizer (TEGOSTAB® B 8444) and cell opener ORTEGOL® 500) were weighed out into a beaker and mixed with a plate stirrer (6 cm diameter) at 1000 rpm for 30 seconds. Then the MDI was added and the reaction mixture was stirred at 3000 rpm with the stirrer described for 5 seconds, then immediately transferred to a wooden crate measuring 27 cm×27 cm×27 cm, open at the top and lined with paper. Simultaneously with the poured introduction of the reaction mixture, tablets from Example 1 were dipped into the crate in sufficient quantity to form a bed around 10 cm in height which is wetted well by the reaction mixture. The amount of foam formulation for use was calculated such that the foam still rose to about 5 cm above and beyond the bed of tablets. After 10 minutes, the composite material was demolded. Using a band saw, a board with a thickness of 2.5 cm was cut out from the block horizontally at a distance of 2.5 cm from the base. 3.5 cm were sawn off from each of the edges, to give a sample specimen measuring 20 cm×20 cm×2.5 cm.

Example 3

Production of a Vacuum Insulation Panel from the Composite Material

The board produced from the composite material in Example 2 was evacuated in a vacuum chamber for 2 hours, reaching a residual pressure of approximately 1 mbar. Under this pressure, the board was welded into a shell of a metalized film (multi-layer laminate from TOYO with PET outer layer, aluminium bather layer and polyethylene inner layer), producing a gas-tight seal around the board. The protruding edge of the film was trimmed off down to the weld seam. The resulting vacuum insulation panel was measured and thermal conductivity using a Hesto HLC-A90 thermal conductivity meter. The measurement value was $8.9*10^{-3}$ $W*m^{-}*K^{-1}$.

While the present invention has been particularly shown and described with respect to various embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A composite material comprising an open-cell polymer foam matrix comprising one or more polymers and, embedded into the polymer foam matrix granules which have an open porosity, wherein said composite material is thermally insulating.

2. The composite material according to claim 1, wherein said composite material has a gas-pycnometric open-cell proportion of greater than 50%.

3. The composite material according to claim 1, wherein the polymer foam matrix is a polyurethane or polyisocyanurate foam.

4. The composite material according to claim 1, wherein the granules are produced from materials having a BET surface area of greater than 5 m$^2$/g.

5. The composite material according to claim 1, wherein the granules consist of compacted powders of fumed silica or precipitated silica.

6. The composite material according to claim 1, wherein the open pores have a pressure of less than 500 mbar.

7. The composite materials according to claim 6, wherein the polymer foam matrix has a gas-tight shell of metal, glass, plastic or a composite of these materials.

8. The composite material according to claim 1, wherein the composite material is a vacuum insulation element or is used as a vacuum insulation element.

9. A method for producing a composite material comprising:
   a. mixing a material for producing a polymer foam matrix with granules having an open porosity to provide a mixture; and
   b. generating from said mixture a thermally insulating composite material comprising an open-cell polymer foam matrix in which the granules are embedded.

10. The method according to claim 9, wherein the material for producing a polymer foam matrix is a polymer or a mixture of polymers or are the reactants for generating the polymer or polymers and wherein a foaming step is further performed.

11. The method according to claim 9, wherein the polymer foam matrix is evacuated and gas-tightly encapsulated.

12. An article comprising a thermally insulating composite material, said thermally insulating composition material comprising an open-cell polymer foam matrix comprising one or more polymers and, embedded into the polymer foam matrix granules which have an open porosity.

* * * * *